United States Patent [19]

Flower et al.

[11] Patent Number: 4,738,435
[45] Date of Patent: Apr. 19, 1988

[54] FLUID FILLED VIBRATION ISOLATOR WHICH OPERATES QUIETLY OVER BRAOD FREQUENCY AND AMPLITUDE RANGES

[76] Inventors: Wallace C. Flower; Richard P. Thorn, both of 1635 W. 12th St., Erie, Pa. 16512

[21] Appl. No.: 887,235

[22] Filed: Jul. 21, 1986

Related U.S. Application Data

[63] Continuation-in-part of Ser. No. 863,837, May 16, 1985.

[51] Int. Cl.⁴ .............................................. F16F 9/10
[52] U.S. Cl. ................................................. 267/140.1
[58] Field of Search ............ 188/320, 322.11, 322.13, 188/322.22; 248/562; 267/140.1, 141.1, 141.2, 141.7, 113

[56] References Cited

U.S. PATENT DOCUMENTS

| | | | |
|---|---|---|---|
| 4,159,091 | 6/1979 | LeSalver et al. | 248/562 |
| 4,422,779 | 12/1983 | Hamaekers et al. | |
| 4,469,316 | 9/1984 | van den Boom et al. | 267/113 X |
| 4,568,069 | 2/1986 | Poupard | 267/140.1 |
| 4,621,795 | 11/1986 | Eberhard et al. | 267/140.1 X |
| 4,632,372 | 12/1986 | Nakajima et al. | 267/140.1 |

FOREIGN PATENT DOCUMENTS 2041485 9/1980 Fed. Rep. of Germany .

OTHER PUBLICATIONS

SAE Technical Paper Series #850975–Understanding Hydraulic Mounts for Improved Vehicle Noise, Vibration and Ride Qualities, author–Wallace C. Flower/-date: May 15–17, 1985.

*Primary Examiner*—Duane A. Reger

[57] ABSTRACT

A vibration isolator of the type having opposed fluid filled chambers separated by a partition having an elongate inertia track passageway providing fluid communication between the chambers is provided with a decoupler disc and cage configuration which attenuates noise over a broad frequency and amplitude spectrum by permitting disc flexure only about peripheral fulcrums.

13 Claims, 5 Drawing Sheets

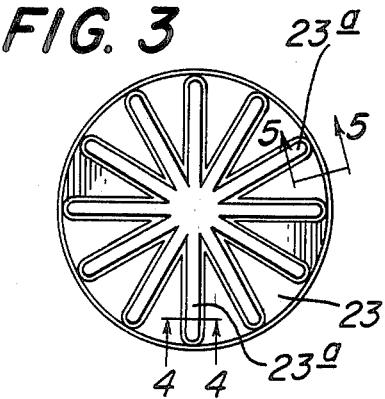
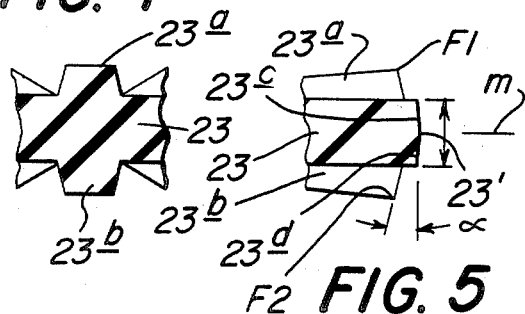
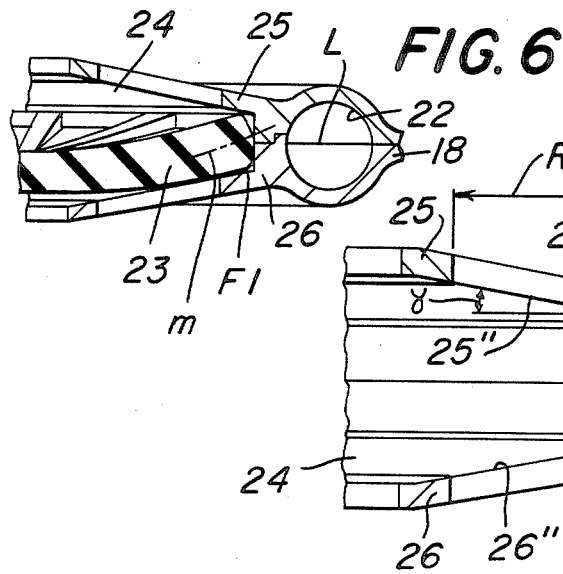
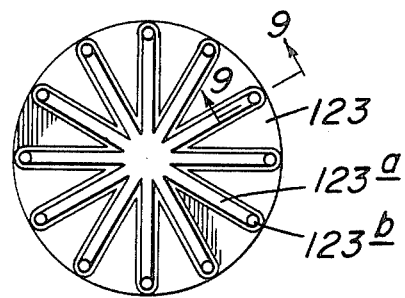
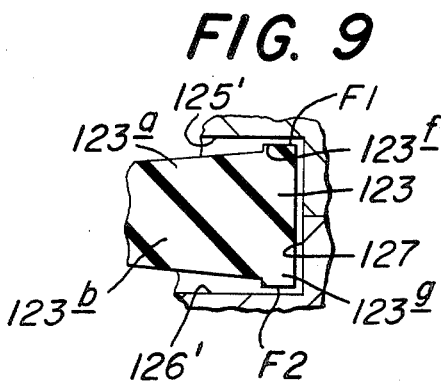

FIG. 15
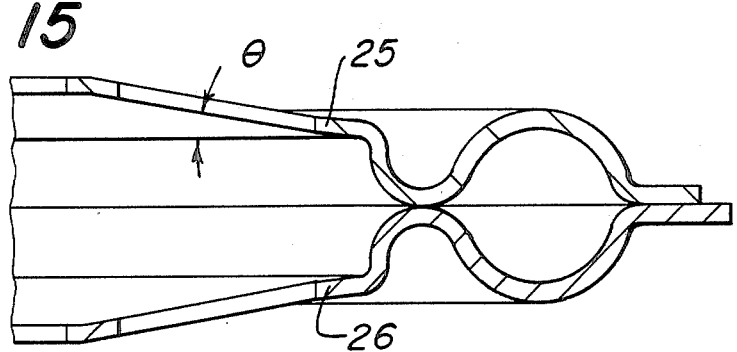
FIG. 16
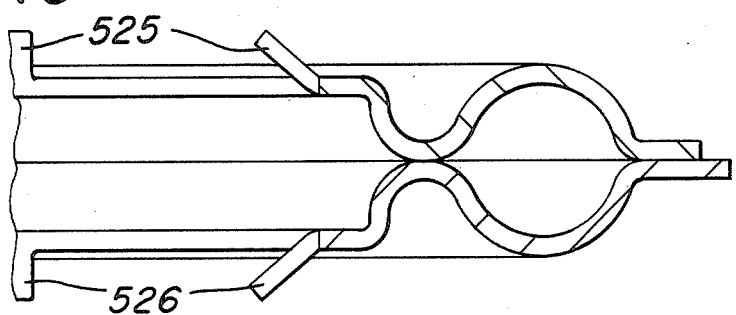
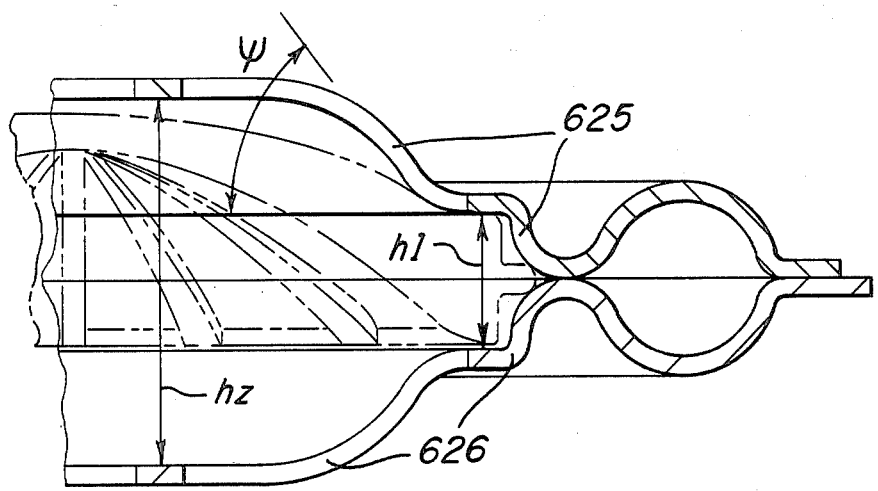
FIG. 17

FLUID FILLED VIBRATION ISOLATOR WHICH OPERATES QUIETLY OVER BROAD FREQUENCY AND AMPLITUDE RANGES

CROSS-REFERENCE TO RELATED APPLICATIONS

The present application is a continuation-in-part of an application entitled "Quiet Acting Fluid Filled Vibration Isolator Having Predictable Low Level High Frequency Minimum Dynamic Stiffness" filed by Wallace C. Flower on May 16, 1985, Ser. No. 863,837 and owned by the assignee of the present application.

FIELD OF THE INVENTION

The present invention relates to fluid filled vibration isolators, and more particularly, the present invention relates to fluid filled vibration isolators which utilize an elongate inertia track in combination with a decoupler to provide certain dynamic operating characteristics.

BACKGROUND OF THE INVENTION

Fluid filled vibration isolators are increasingly being utilized to mount engines and transmissions in automobiles. A typical fluid filled isolator may include a pair of superposed variable-volume, fluid filled chambers separated by a partition in which is provided an elongate, generally arcuate inertia track passageway providing continuous fluid communication between the chambers. A so-called decoupler may be provided in the partition between the opposed chambers. The decoupler oscillates in response to alternate pressurization of the fluid in chambers to provide certain dynamic operating characteristics. For example, fluid filled vibration isolators of the aforementioned general type exhibit a certain minimum dynamic stiffness at a relatively low excitation frequency (0–30 Hz.) at large amplitudes ($\pm 1.0$ mm) and another minimum dynamic stiffness at a higher frequency (above 150 Hz.) under small input amplitude excitations (i.e. $\pm 0.1$ mm.).

Essentially two types of decouplers are used commercially in fluid filled vibration isolators. One type includes a diaphragm which is either clamped or bonded about its periphery and which flexes in alternate directions as the fluid in the chambers is alternately pressurized. An advantage of diaphragm decouplers is that they are quiet in operation. A disadvantage is that the diaphragm stretches at its periphery during flexure, and such stretching can reduce its fatigue life and hence affect adversely the durability of the vibration isolator. Moreover, it is more difficult for a designer precisely to predict the high frequency dynamic operating characteristics of a vibration isolator having diaphragm-type decouplers.

The other type of decoupler in common use is a relatively stiff disc which oscillates in a translatory manner within a perforate cage located between the fluid chambers. Oscillatory motion is limited by annular cage surfaces which extend across opposite sides of the disc and engage the disc to arrest its translatory motion. An advantage of disc decouplers is that they avoid the fatigue problems associated with diaphragm-type decouplers, and disc decouplers operate in a more precisely predictable manner. A disadvantage is that operation of the decoupler disc under certain operating conditions generates audible noises which can be transmitted into the vehicle. Also disc-type decouplers can present fluid leakage problems.

While both types of decouplers cooperate with their associated inertia track passageways to provide a minimum dynamic stiffness at a relatively high frequency level, it has been difficult for designers to predict precisely the frequency at which such minimum stiffness will occur. Moreover, the magnitude of such minimum stiffness has neither been as low nor as broad in bandwidth as desired for many applications. Also, regardless of the type decoupler employed, a commercially successful fluid filled vibration isolator must be capable of being assembled efficiently.

An effort to achieve some of the foregoing advantages has been made by Metzeler Kautschuk Gmbh (Metzeler) of West Germany. For example, in a commercially available vibration isolator produced by them, a radially ribbed elastomeric decoupler disc (like that illustrated in FIG. 3 herein) is mounted in a cavity in a die cast inertia track decoupler plate assembly. One component of the plate assembly is formed with a shallow cylindrical recess, and the other component includes a flat plate which overlies the recess to provide a decoupler disc cage having parallel opposed surfaces. The decoupler disc fits snugly in the cavity and is exposed to fluid in the opposed chambers via orifices provided in both components of the plate assembly. The inertia track passageway surrounds the decoupler disc cage.

With the Metzeler construction, the maximum excursion of the decoupler disc is quite limited, the cage orifices are relatively small in size, and joints exist which present leak paths across the decoupler disc and between the inertia track passageway and decoupler cavity. While the Metzeler decoupler disc and plate configuration may function satisfactorily and relatively quietly in certain applications, there is a need for a fluid filled vibration isolator that can operate quietly over a broad range of dynamic operating conditions, that can provide a precisely predictable low level minimum dynamic stiffness at a relatively high excitation frequency level, that provides other desirable dynamic operating characteristics at lower frequency levels and at various input excitation amplitudes, and that is leak resistant and capable of being manufactured efficiently by high speed mass production techniques.

OBJECTS OF THE INVENTION

With the foregoing in mind, a primary object of the present invention is to provide a novel fluid filled vibration isolator which functions quietly to provide a relatively low minimum dynamic stiffness at a predetermined high frequency excitation level in addition to providing other desirable low frequency dynamic operating characteristics.

Another object of the present invention is to provide a fatigue resistant, quiet operating decoupler assembly for use in a liquid filled vibration isolator having an inertia track passageway.

A further object of the present invention is to provide a fluid filled vibration isolator which overcomes the limitations of known fluid filled vibration isolators yet can be manufactured efficiently using high speed mass production techniques.

As yet a further object, the present invention provides a quiet and durable decoupler which cooperates with an inertia track passageway in a fluid filled vibration isolator to provide a relatively low minimum dynamic stiffness at a precisely predictable high frequency level.

SUMMARY OF THE INVENTION

More specifically, the present invention provides a fatigue resistant fluid filled vibration isolator which operates quietly over a broad amplitude and frequency spectrum and which provides a relatively low dynamic stiffness at a predictable high frequency level in addition to providing certain other desirable low frequency operating characteristics. To this end, the vibration isolator includes a pair of opposed variable-volume, fluid filled chambers separated by a bipartite partition having an elongate, arcuate inertia track passageway in continuous fluid communication with the chambers and a perforate mounting cage within which is mounted a flexible decoupler disc. The decoupler disc has a peripheral edge configuration which cooperates with confronting annular peripheral mounting cage surfaces to restrain the disc against translatory motion at its edge while providing peripheral fulcrums about which the disc can pivot adjacent its edge. In several embodiments, the decoupler disc and its mounting cage are configured to permit free flexure of the disc without centralized bottoming while cooperating to arrest progressively flexural motion of the disc inwardly of its edge. The peripheral fulcrums may be provided on opposite sides of the disc adjacent to its edge for engaging spaced mounting cage surfaces or may be provided by a circumferential bead located on the peripheral edge of the disc for engaging closely-spaced converging cage surfaces surrounding the periphery of the disc. In other embodiments, the decoupler disc is concave on opposite sides and has continuous peripheral edge margins which are engaged by the decoupler cage to provide the aforedescribed advantages while also attenuating high frequency chortling noises.

The aforedescribed decoupler structure provides a preferred means for controlling vibrations by a method in which fluid in the chambers is alternately pressurized and the decoupler disc circumferentially confined in a particular manner so that it flexes without substantial tension adjacent its edge and its flexural displacement is progressively arrested inwardly of its edge. In this manner, the vibration isolator of the present invention operates quietly over a broad amplitude and frequency spectrum for prolonged periods to provide a relatively low minimum dynamic stiffness at a predictable high excitation frequency level while also providing the desirable low frequency operating characteristics normally associated with vibration isolators having inertia track passageways and decouplers.

BRIEF DESCRIPTION OF THE DRAWINGS

The foregoing and other objects, features and advantages of the present invention should become apparent from the following description when taken in conjunction with the accompanying drawings, in which:

FIG. 3 is a plan view of one form of decoupler disc used in the decoupler assembly of the present invention;

FIGS. 4 and 5 are enlarged fragmentary cross-sectional views taken on lines 4—4 and 5—5, respectively, of FIG. 3;

FIG. 6 is an enlarged fragmentary transverse sectional view of a portion of the decoupler assembly of the present invention shown with the decoupler disc flexed into one of its operating positions;

FIG. 7 is a greatly enlarged view, similar to FIG. 6, but without the decoupler disc shown for more clearly depicting certain preferred construction details of the decoupler disc cage;

FIG. 8 is a plan view of another modified embodiment of a decoupler disc according to the present invention;

FIG. 9 is an enlarged fragmentary sectional view taken on line 9—9 of FIG. 8;

FIG. 15 is a view similar to FIG. 14 but with the decoupler disc removed for the purpose of showing certain preferred dimensional relations of the decoupler cage; and FIGS. 16 and 17 are sectional views, similar to FIG. 15, but illustrating further modified embodiments of decoupler cage designs in accordance with the present invention;

DESCRIPTION OF THE PREFERRED EMBODIMENT

Figure 1:
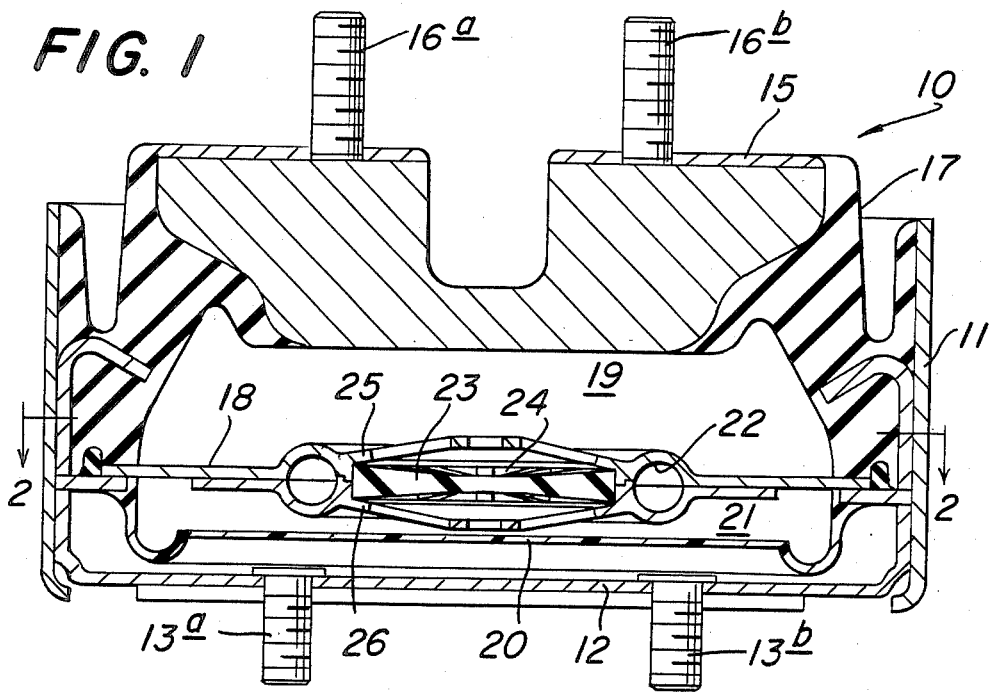
FIG. 1 is a transverse sectional view of a fluid filled vibration isolator having a decoupler assembly embodying the present invention.

Referring now to the drawings, FIG. 1 illustrates a fluid filled vibration isolator 10 embodying the present invention. The vibration isolator 10 includes a housing 11 having a rigid bottom wall 12 with a pair of depending threaded mounting studs 13a and 13b and an upper mounting plate 15 having a plurality of upstanding threaded mounting studs 16a, 16b. The mounting plate 15 is bonded to an upper flexible wall 17 which in turn is bonded to and mechanically fastened within the housing 11 in the manner illustrated. A bipartite partition, or plate assembly, 18 extends across the housing 11 above the lower wall 12 and cooperates with the upper flexible wall 17 to define an upper primary pumping chamber 19 containing a working fluid (not shown). A lower flexible wall 20 is mounted intermediate the partition 18 and the lower wall 12 of the housing 11 and cooperates wtih the partition 18 to define a lower secondary accumulator chamber 21 adapted to contain working fluid displaced thereinto from the upper primary chamber 19 when its wall 17 is displaced downwardly to pressurize fluid in the chamber 19.

Figure 2:
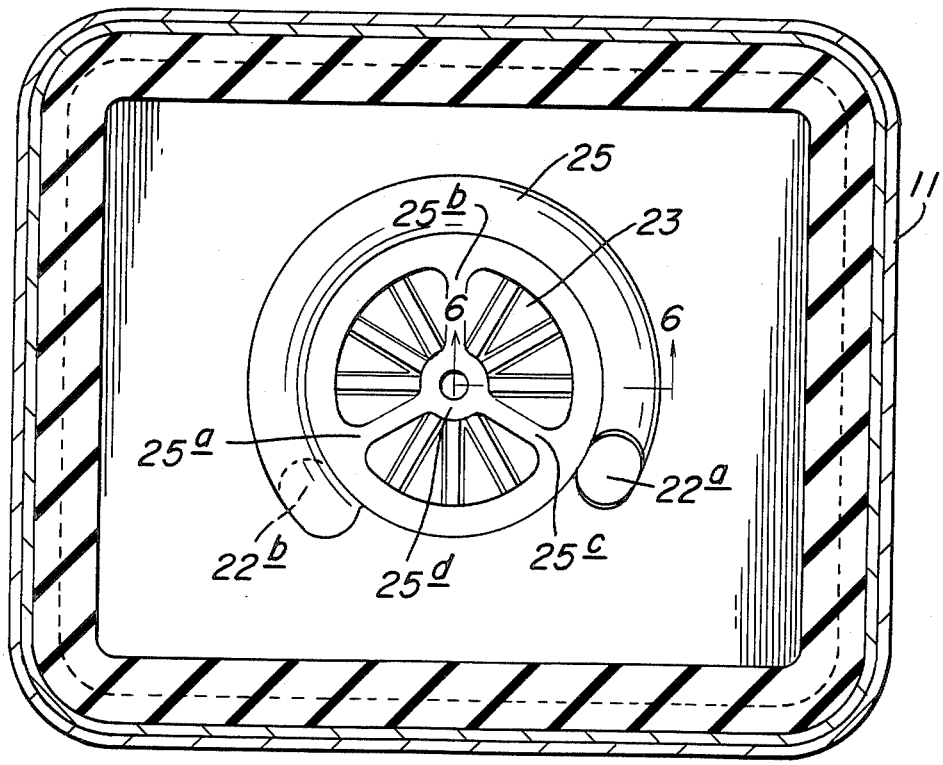
FIG. 2 is a sectional view taken on line 2—2 of FIG. 1.

The primary chamber 19 is in continuous fluid communication with the lower chamber 21 by means of an inertia track, or passageway, 22. As best seen in FIG. 2, the inertia track passageway 22 has a port 22a at one end which opens upwardly into the primary chamber 19, and the inertia track passageway 22 has a port 22b at its other end which opens downwardly into the secondary chamber 21. As well known in the art, the inertia track passageway 22 cooperates with the working fluid in the chambers 19 and 21 to provide the vibration isolator 10 with a minimum dynamic stiffness at a first predetermined excitation frequency which may be, and usually is, at a relatively low frequency level such as 8.0 Hertz.

It is known in the art to utilize so-called disc type decouplers to further modify the dynamic stiffness of fluid filled vibration isolators. A typical decoupler assembly includes a flat circular disc, similar to the specially shaped disc 23 used in the present invention and illustrated in FIGS. 1 and 2, mounted for oscillation within a cavity, or passage, 24 located between a pair of upper and lower webs 25 and 26 each of which has radial spider arms, such as the upper spider arms 25a–25c, that cooperate in the bipartite partition 18 to provide the perforate decoupler disc mounting cage, or cavity 24 in fluid communication with the chambers 19 and 21. In addition to other possible functions, the decoupler assembly may provide the vibration isolator 10 with a second region of minimum dynamic stiffness at an excitation frequency level which is greater than the excitation frequency level obtained with only an inertia track.

As described thus far, the fluid filled vibration isolator 10 exhibits known dynamic operating characteristics such as described heretofore. A more detailed discussion of the dynamic operating characteristics of fluid filled vibration isolators may be found in an article entitled *Understanding Hydraulic Mounts for Improved Vehicle Noise, Vibration and Ride Qualities* by Wallace C. Flower, SAE Technical Paper Series No. 850975, May 1985, the disclosure of which is incorporated by reference herein. In addition to providing desirable operating characteristics such as discussed in the referenced article, a fluid filled vibration isolator of conventional decoupler disc construction also has undesirable operating characteristics such as being prone to generating noise under certain operating conditions, providing high frequency minimum dynamic frequency at excitation levels which are difficult to predict accurately, and providing the high frequency minimum dynamic stiffness at a level which is neither as low as desired nor as broad in bandwidth as desired for some applications. While the aforedescribed Metzeler decoupler disc-cage configuration attempts to address some of these problems, it has certain limitations which render it less than entirely satisfactory over a broad range of dynamic operating conditions.

The present invention solves the problems mentioned above by providing a fluid filled vibration isolator which operates quietly over a broad range of excitation frequencies and amplitudes, which provides a relatively low level high frequency minimum dynamic stiffness at a predictable frequency level, and which is leak resistant, durable and capable of being manufactured efficiently. To this end, the present invention achieves the aforementioned objectives by providing a decoupler disc and cage configuration having confronting surface and edge shapes that cooperate to provide fulcrums about the periphery of the decoupler disc and to gently arrest disc flexure. The fulcrums permit the disc to pivot about its periphery and to flex centrally in a controlled manner in response to alternate pressurization of fluid in the opposed chambers but without bottoming under most anticipated operating conditions. This pivotal and flexural movement of the decoupler disc occurs without the disc being subjected to fatigue inducing tension adjacent its edge and without undergoing noise inducing translatory motion. As a result, the decoupler disc and cage of the present invention function in a hybrid manner to provide the desirable dynamic operating characteristics of both diaphragm and disc-type decouplers but without their undesirable dynamic operating characteristics.

One illustrative embodiment of disc and cage construction may be seen in FIGS. 1–7. In this embodiment, as best seen in FIG. 3, the decoupler disc 23 is molded of elastomeric material and has circular flat upper and lower surfaces on which are formed a plurality of narrow, radially extending raised, tapered ribs, such as the ribs 23a, 23b, respectively (FIG. 4). The ribs 23a, 23b taper, or decrease in height, in the radial direction from the periphery of the decoupler disc 23 to the center thereof. See FIGS. 4 and 5. The ribs 23a, 23b terminate adjacent to the periphery of the decoupler disc 23 and thereby provide a plurality of peripheral fulcrums such as $F_1$, $F_2$ (FIG. 5) on the peripheral margin on each side of the decoupler disc 23. The decoupler disc 23 has a circular peripheral edge defined by a pair of converging surfaces 23c, 23d which intersect at the horizontal median M of the disc 23 and define thereat an angular bead 23' which extends continuously about the entire periphery of the disc 23. The bead defining surfaces 23c, 23d form therebetween a dihedral angle of 166 degrees, or a small angle $\alpha$ of about 7 degrees with respect to a vertical line through the medial plane M. For purposes to be discussed, the aforedescribed ribbed decoupler disc configuration provides a certain measure of flexibility in its centralized region and a certain measure of flexural stiffness which varies in a radial direction therefrom, with the greatest level of flexural stiffness being located adjacent to the periphery of the disc 23. A disc similar to this construction, but without the dihedral bead surfaces, is used in the aforedescribed Metzeler isolator.

To minimize the level of the high frequency dynamic stiffness notch, and to predetermine the frequency at which it occurs, a maximum amount of the decoupler disc 23 is exposed to each chamber. For this purpose, as best seen in FIG. 1, the decoupler cage webs 25, 26 have narrow spider arms such as the arms 25a–25c which converge at a central gusset 25d which preferably has an orifice therein. The lower cage spider arms 26a–26c are similarly configured for like purposes. The narrow spider arms 25a, 25c coupled with the small size of the central gusset 25d, provide a relatively large opening confronting the chamber 19. The area of this opening is preferably greater than about 70% of the corresponding area of one side of the decoupler disc 23.

When the decoupler disc 23 is mounted in its cavity 24 between the cage webs 25 and 26, it is disposed with its horizontal medial plane M aligned with the line of juncture L between the upper and lower decoupler cage webs 25 and 26. Under static conditions, as best seen in FIG. 1, the decoupler disc fulcrums $F_1$, $F_2$ engage interior annular confronting surfaces of the cage webs 25, 26 closely adjacent the cylindrical vertical wall 27 which extends therebetween and around the periphery of the decoupler disc 23.

In this embodiment, the cage webs are either molded or machined to provide a labyrinth-like joint 29 between the inertia track passageway 22 and the decoupler mounting cavity 24 to minimize fluid leakage therebetween. The joint 29 is located about the periphery of the disc 23 midway between its opposite surfaces. The disc bead 23' on the periphery of the disc 23 is aligned with the joint 29, and is spaced about 0.005 inches from the cavity wall 27 at the joint 29. Thus, the location of the joint 29 combined with the location of the decoupler disc bead 23' adjacent thereto cooperate to prevent fluid leakage both between the decoupler cavity 24 and inertia track passageway 22 and between opposite fluid chambers 19 and 21.

When the decoupler disc 23 is subjected to a pressure differential across opposite top and bottom sides thereof in the course of dynamic operation of the vibration isolator 10, such as in response to a greater pressure in the upper chamber 19 than in the lower chamber 21, the central portion of the decoupler disc 23 flexes downwardly into the position illustrated in FIG. 6. Such flexure is afforded in a relatively low friction manner by the counterclockwise pivotal movement of the peripheral edge portion of the decoupler disc 23 about its lower rib fulcrums $F_2$. This pivotal motion permits the centralized portion of the decoupler disc 23 to bow downwardly, or balloon, as a result of the aforementioned fluid pressure differential. Of course, when the pressure differential reverses, the disc 23 is deflected upwardly in a similar manner. Thus, the centralized portion of the decoupler disc 23 flexes alternately upwardly and downwardly within the decoupler cage 24 while its peripheral edge portion is constrained against translatory vertical movement which can cause impact noise to be generated. The flexural motion is afforded without undesirable fatigue inducing tension being induced in the disc 23 at its periphery as a result of the light pressure by which the peripheral edge of the decoupler disc 23 is confined between the inner confronting surfaces 25', 26' of the decoupler cage webs 25 and 26. The light pressure, combined with the lubricity of the working liquid in the chambers 19, 21 cooperates to provide the desired low friction pivotal movement about the periphery of the decoupler disc 23. The peripheral bead 23' on the disc 23, being located closely adjacent to the disc cavity wall 27, minimizes fluid leakage past the disc 23 between the fluid chambers 19 and 21, as well as across the joint 29.

For the purposes of ensuring the aforementioned flexure of the disc 23 and of ensuring quiet operation, the inner annular confronting surfaces of the decoupler cage webs 25 and 26 are configured in a particular manner to coact with the decoupler disc surfaces to gently arrest disc flexure. As best seen in FIG. 7, this is achieved by providing an upwardly tapered outer annular surface 25' on the upper cage web 25 adjacent the peripheral vertical cage wall 27. The tapered surface 25' extends radially inward from the wall 27 for a radial extent $R_1$, corresponding to about 5% of the diameter of the decoupler disc 23. A further upwardly tapered inner surface 25" is provided radially inward of the surface 25' and extends for a further radial extent $R_2$, corresponding to about 34% of the diameter of the decoupler disc 23. The lower cage web 26 has similarly tapered surfaces 26', 26". The outer tapered cage surfaces 25', 26' which confront opposite sides of the outer periphery of the disc 23 accommodate movement of the enlarged outer ends of the decoupler disc ribs 23a, 23b, as the decoupler disc 23 pivots about the fulcrums $F_1$, $F_2$ provided thereby.

The inner tapered cage surfaces 25", 26" progressively engage the tapered disc ribs 23a, 23b to decelerate flexural motion of the disc in its central region. For example, flexural deceleration is accomplished by the progressive radially inward interengagement of the tapered rib and cage surfaces with increasing displacement of the central portion of the disc 23. By progressively causing flexurally stiffer zones of the disc 23 to be engaegd, disc flexural deceleration occurs gradually and this is very instrumental in avoiding the generation of impact noises under most operating conditions.

To insure satisfactory operation of the vibration isolator of the present invention, certain decoupler disc and cage configuration dimensional relations should be observed. For instance, to maintain the aforementioned disc confinement pressure, the height $h_1$ of the decoupler cage 24 between the fulcrums $F_1$, $F_2$ on opposite sides of the disc 23 should not be less than about 95% of the maximum thickness of the decoupler disc 23 measured between the fulcrums $F_1$, $F_2$. More preferably, the height $h_1$ is about 98% of the maximum thickness of the decoupler disc adjacent its periphery. The height $h_1$ could be about 105%, which results in a very slight axial clearance being provided.

To provide sufficient clearance to accommodate the aforedescribed pivotal movement of the decoupler disc 23, the outer cage web surface 25' should taper upwardly from the peripheral cage wall 27 at an angle $\beta$ which is preferably at least about 5 degrees but which can exceed 15 degrees. The radial extent $R_1$ of the aforementioned outer angular surface should be in a range of 3% to about 20% of the diameter of the decoupler disc 23, and preferably about 5% thereof. Further inwardly, where the decoupler cage web surface 25" inclines at an increased angle $\gamma$, the angle $\gamma$ should be at least about 10 degrees, but may exceed about 20 degrees. The radial extent $R_2$ of this inner angle of inclination is at least about 30% of the diameter of the decoupler disc 23. Angles in excess of about 5 degrees in each region $R_1$ and $R_2$ are important in avoiding load-drone noise caused by decoupler disc bottoming against the spider arms of the decoupler disc mounting cage.

In the embodiment of FIGS. 1–7, tapered operating clearances are provided between the disc cage and the disc adjacent to their peripheries. Instead of providing tapered operating clearances, satisfactory operation may be achieved by using a cage construction wherein the upper and lower confronting cage surfaces 125', 126' are parallel to one another and intersect the vertical cage wall 127 at a right angle such as illustrated in FIGS. 8 and 9. The decoupler disc fulcrums $F_1$, $F_2$ are provided by nibs 123f, 123g located on the upper and lower decoupler disc ribs 123a and 123b, respectively. In this embodiment, a slight clearance may be provided between the outer periphery of the decoupler disc 123 and its surrounding peripheral cage wall 127 or a bead (not shown but like the bead 23') may be provided. This disc and cage configuration permits the requisite degree of decoupler disc peripheral pivotal motion to occur without requiring tapered cage surfaces adjacent the periphery of the disc. Preferably, however, the decoupler disc cage is provided with an inner annular tapered region, such as the region $R_2$, wherein the cage spider arms taper such as in the manner illustrated in FIG. 7 to provide the desired degree of decoupler disc flexural deceleration for noise abatement purposes.

Figure 10:
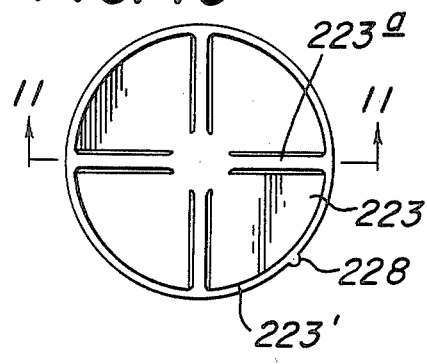
FIG. 10 is a plan view of further modified embodiment of a decoupler disc of the present invention.
Figure 11:
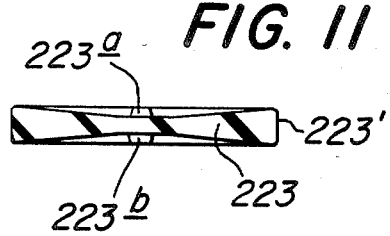
FIG. 11 is a transverse sectional view taken on line 11—11 of FIG. 10.

A decoupler disc of lower flexural stiffness than illustrated in FIGS. 1–7 is illustrated in FIGS. 10 and 11. In this embodiment, the decoupler disc 223 is similar to the decoupler disc 23 but has four upper and lower radial tapered ribs 223a, 223b. Between the ribs 223a, 223b, the disc 223 is of relatively thin uniform thickness. Preferably, the disc 223 is provided with a raised flange 223' which extends continuously about the entire periphery of the disc 223 to provide a continuous fulcrum on opposite sides of the disc and to enhance the resistance of the decoupler disc to leakage between the fluid chambers in the course of operation. While this rib and flange configuration reduces the overall flexural stiffness of the decoupler disc 223, which is desirable in certain applications, it requires a locator tab 228 in order to insure that the ribs 223a are aligned with cage spider arms so that the requisite degree of decoupler disc flexural deceleration can be realized for noise abatement purposes.

Figure 13:
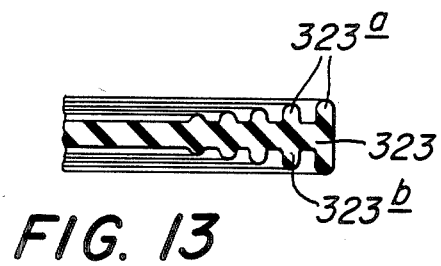
FIG. 13 is an enlarged transverse sectional view taken on line 13—13 of FIG. 12.
Figure 12:
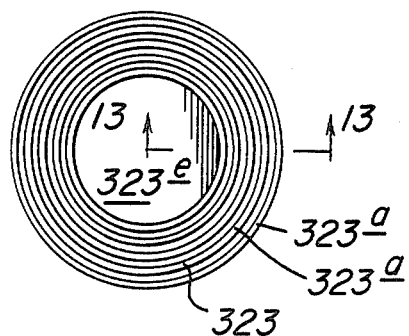
FIG. 12 is a plan view of a still further modified embodiment of a decoupler disc according to the present invention.

For the purpose of providing a decoupler disc of even lower flexural stiffness while eliminating the need for a locator tab, the embodiment of FIGS. 12 and 13 is provided. In this embodiment, the decoupler disc 323 is provided with a plurality of raised circular concentric ribs 323a, 323b extending in radially spaced relation on the upper and lower sides of the disc 323. The ribs, such as the ribs 323a on the topside of the disc 323, decrease in height in a radial direction toward the circular central region 323e of the disc 323. The radial spacing between each rib is about equal to the thickness thereof, and the height of each rib decreases so that they lie within a small angle of about the same magnitude as the angle of taper of the ribs 23a, 223a of the aforedescribed embodiments, i.e. about 7 degrees. With this embodiment, the concentric ribs engage the tapered cage spider arms to provide the desired degree of disc deceleration without having the higher flexural stiffness associated with tapered radial ribs.

In the embodiments described thus far, the decoupler cage is fabricated either of molded plastic or machined metal construction. This has the advantage of enabling a labyrinth seal to be provided along the line of juncture where the cage components meet and between the inside of the decoupler cage 24 and the inside of the inertia track passageway 22. While the labyrinth seal eliminates leakage, the molded or machined construction of the inertia track decoupler plate components is not as inexpensive as desired.

Figure 14:
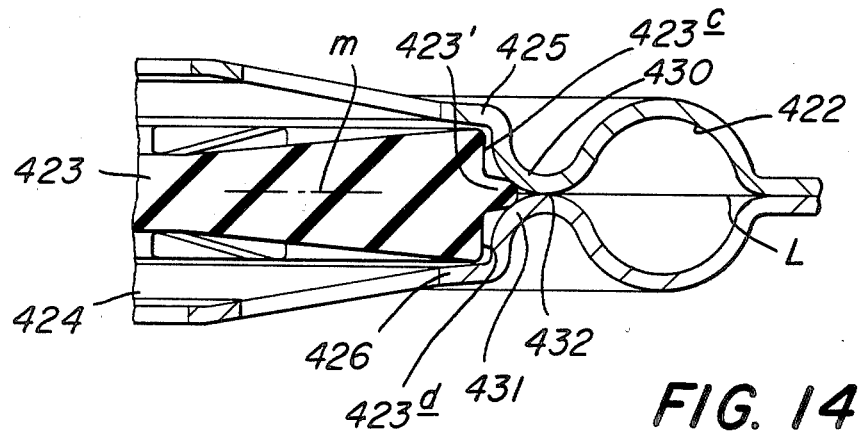
FIG. 14 is a greatly enlarged fragmentary sectional view of another embodiment of a decoupler assembly of the present invention.

For the purpose of providing the aforementioned desirable vibration isolator operating characteristics and of preventing leakage between the decoupler cage 24 and inertia track passageway 22, with an inexpensive structure, the embodiment of FIG. 14 is provided. In this embodiment, the decoupler disc cage is provided by a pair of stamped metal plates 425, 426, which are superimposed to define the decoupler disc cage, or cavity 424, within which the decoupler disc 423 is mounted. The decoupler disc 423 is similar in construction to the decoupler disc 23, insofar as the tapered ribs on opposite sides thereof are concerned. In like manner, the decoupler disc cage plates 425, 426 have tapered inner and outer annular surfaces for the purposes described heretofore with respect to the embodiment of FIG. 7.

In the embodiment of FIG. 14, the upper and lower plates 425, 426 are provided with curved sections 430, 431 which surround the outer periphery of the decoupler disc 423 and which have curved converging surfaces that merge at the medial plane L of the cage assembly along a circular joint 432. The cage plates 425, 426 are superimposed and permanently fastened together outward of the inertia track passageway 422, as by spot welding. Thus, neither gasketing nor any fastening is provided between the decoupler cavity 24 and the inertia track passageway 22.

In this embodiment, the joint 432 between the plates 425, 426 is sealed, and the aforementioned advantages of low friction decoupler disc edge constraint are provided by means of a suitably shaped bead on the decoupler disc. To this end, the outer periphery of the decoupler disc 423 is provided with a circumferential bead 423' which extends radially outward in cantilever fashion on the medial plane M of the decoupler disc 423. In the illustrated embodiment the bead 423' has a length of about 2 mm., and is slightly longer in the radial direction that it is wide in the edgewise direction, and slightly tapered, providing a ratio of radial length to thickness on the order of about 1:1.5. The outermost edge of the bead 423' is rounded, such as illustrated, and engages between the curved converging surfaces provided by the curved plate sections 430, 431. Thus, the bead 423' cooperates with the curved plate sections 430, 431 to provide the aforementioned pivot fulcrums while simultaneously sealing the joint 432. In this embodiment, the decoupler disc edge surfaces 423c, 423d extend vertically about the periphery of the decoupler disc 423 above and below the bead 423'. Preferably, small clearance spaces are provided between the surfaces 423c, 423d and the upper and lower cage plates 425, 426 in the regions indicated in FIG. 14 to ensure flexural freedom in these regions. This embodiment provides the dynamic operating advantages noted above while enabling manufacturing efficiencies to be realized with the use of stamped metal plates.

While the embodiment of FIG. 14 functions satisfactorily to provide the desired dynamic operating characteristics noted above, it has been determined that there is a certain narrow range of operating conditions which can cause drone noise to be generated in a vehicle. It is believed that such noise results from the bottoming out of the decoupler disc with the upper and lower cage spider arms when certain road conditions and engine speeds occur simultaneously. For instance, FIG. 15 illustrates only the decoupler cage configuration of the embodiment illustrated in FIG. 14, and it may be observed that the decoupler cage spider arms extend in overlying and underlying relation with the decoupler disc. Even though tapering at an angle $\theta$ of up to about 30 degrees, and preferably in a range of about 15 degrees to about 20 degrees, with this cage construction, when the central region of the decoupler disc flexes excessively, it bottoms against the spider arms, and this can generate noise.

In order to avoid the aforementioned decoupler disc and cage contact, and hence to abate noise produced thereby under certain conditions, the embodiments of FIGS. 16 and 17 are provided. These embodiments are like in most respects to the embodiment of FIG. 15; however, in the embodiment of FIG. 16, the decoupler cage spider arms are relatively short in length, i.e. about ⅓ of the decoupler disc diameter, and do not extend across either the upper or lower surface of the decoupler disc. Preferably, three short radial arms, such as the upper arm 525 and the lower arm 526 are provided at equally spaced locations about the decoupler disc periphery. The arms 525, 526 are bent upwardly and downwardly with respect to the decoupler disc cavity at an angle of about 45 degrees. The arms 525, 526 prevent the decoupler disc from popping out of its cage under extreme operating conditions while eliminating the cage structure which might generate noise.

In the embodiment of FIG. 17, the decoupler cage spider arms are retained, as in the embodiment of FIG. 15; however, the spider arms extend in parallel relation with respect to opposite sides of the decoupler disc over substantial portions thereof, as contrasted with the structure of FIG. 15 wherein the cage spider arms are tapered over most of the area of the decoupler disc. In the embodiment of FIG. 17, the upper and lower decoupler cage web plates 625, 626 are bent upward and downward at an angle $\psi$ in a range of between 20 degrees and 90 degrees, and preferably at an angle of about 60 degrees. The height $h_2$, or interior vertical distance between the spider arms 625, 626, is preferably about 40% of the inside diameter of the decoupler disc cavity. Thus, in this embodiment the overlying and underlying spider arms are sufficiently spaced from the decoupler disc as not to be engaged even in response to substantial displacements of the central portion of the decoupler disc from its normal range of movement.

By way of example, vibration isolators constructed in accordance with the teachings of the present invention as discussed thus far, have been found to exhibit high frequency minimum dynamic stiffness levels of less than about 60% of the low frequency minimum dynamic stiffness level. Moreover, such high frequency minimum stiffness has been determined to occur at a frequency level in a readily predictable range of about 100–200 Hertz. Vibration isolators of the present invention have also been found to operate quietly under a wide range of conditions.

It has been observed that under certain operating conditions, some fluid filled vibration isolators can develop and transmit into the passenger compartment of a vehicle so-called chortling noises. Chortling noises may best be described as a highly undesirable metallic wrapping, or rattling, sound. Chortling noises tend to occur in the high frequency range of operation of the vibration isolator, i.e. above about 200–300 Hertz, and are believed to be caused by certain engine firing disturbances which combine with certain vehicle structural and acoustical characteristics to establish standing wave resonances within the vibration isolator. The present invention solves the aforementioned chortling noise problem by providing a decoupler disc of a particular configuration which is constrained about its periphery in a cage to flex and pivot about edge fulcrums in essentially the same manner as the decoupler discs in the aforementioned embodiments.

Figure 18:
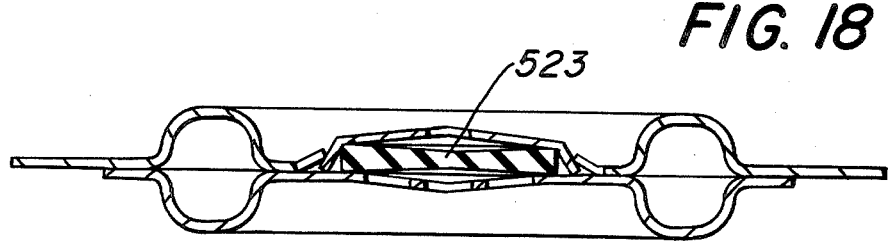
FIG. 18 is a sectional view of a further modified embodiment of the present invention.
Figure 19:
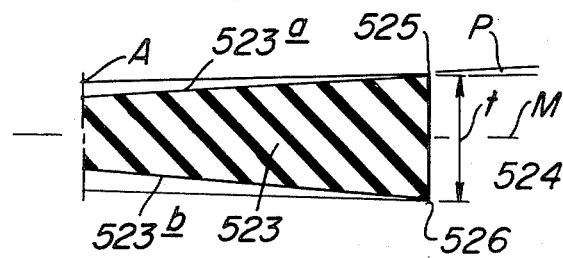
FIG. 19 is an enlarged fragmentary cross-sectional view of the decoupler disc illustrated in FIG. 18.

In this embodiment, as illustrated in FIGS. 18 and 19, the decoupler disc 523 is symmetrical about a horizontal medial plane M and central axis A and has a circular peripheral edge 524 of a predetermined thickness t and upper and lower recessed surfaces 523a, 523b, respectively confronting the upper and lower fluid chambers. The recessed upper and lower surfaces 523a, 523b are concave, and preferably of a shallow conical configuration as shown. In the illustrated embodiment, the upper and lower surfaces 523a, 523b taper radially inward from the peripheral edge 524 of the disc at a nominal angle $\rho$, intersecting the peripheral edge 524 at an acute angle of about 5 to 6 degrees to define continuous upper and lower feathered sealing edges 525, 526 on opposite sides of the medial plane M of the decoupler disc 523. The upper and lower conical surfaces converge from the edge 524 toward the center of the disc 523 to provide a minimum disc thickness which, in the illustrated embodiment, is less than about 50% of the thickness t of the disc 523 at its edge 524. A preferred disc has an edge thickness of 0.140 inches and an outside diameter of 1.12 inches. The decoupler disc 523 is molded of a flexible resilient material, such as a soft elastomer having a shear modulus of about 100 psi., providing a stiffness in a range of about 1.0 to about 20.0 pounds per inch adjacent its peripheral edge 524.

When the decoupler disc 523 is mounted in its cage in the manner illustrated in FIG. 18, it is subjected to a slight amount of precompression across its peripheral edge. With a decoupler disc having the above-mentioned edge thickness, the amount of precompression is preferably about 0.005 inches. As a result, the decoupler disc 523 is constrained against edgewise translation in the vertical direction while both a desired degree of pivotal movement adjacent the disc edge 524 and a desirable continuous sealing action is provided between the decoupler disc 523 and its mounting cage along the sealing edges 525, 526.

The capability of this embodiment of the present invention to eliminate chortling noises has been confirmed by comparative tests between a vibration isolator having a freely movable decoupler disc and a vibration isolator of like construction having an edge constrained decoupler disc. Both isolators were mounted between the engine and frame of an automobile with their upper, or high pressure, chambers disposed on top. In the tests, an accelerometer was mounted to the vehicle frame bracket adjacent to the underside of each vibration isolator, and acceleration levels were measured with the engine idling, transmission in neutral, and brakes locked. The engine was a 3.8 liter V-6 type idling at about 725 rpm. In the control isolator, the decoupler disc was permitted to oscillate within its cage through a total amplitude of 0.060 inches. The test results are illustrated graphically in FIG. 20.

Figure 20:
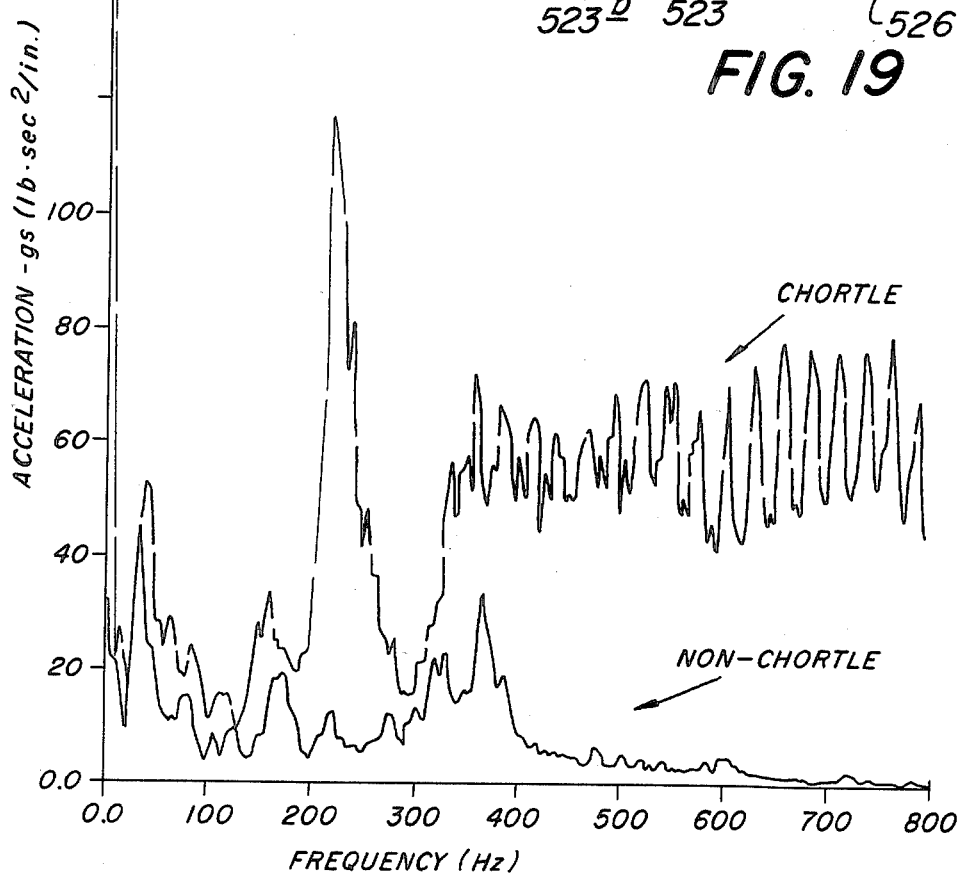
FIG. 20 is a graph illustrating relative chortling noise abatement capabilities of the vibration isolator of the present invention.

As indicated in FIG. 20, the chortling noise phenomenon described above as occurring in the control isolator is coincident with g-force acceleration variations (lb. sec.$^2$/in.) indicated by the dashed sawtooth-like curve which begins at about 300 Hertz and continues up to 800 Hertz. Essentially all of the acceleration variations, even the minimum levels thereof, are above 50 milli-gs in this range. In contrast, the solid line curve generated by the vibration isolator of this embodiment, indicates a very low level of acceleration above 400 Hertz, and even the acceleration levels below 400 Hertz are low in comparison with the values observed in the control vibration isolator wherein the decoupler disc is able to translate freely in its cage. These lower levels of acceleration coincide with the absence of chortling noises.

While the precise theory by which the present invention functions to eliminate chortling noises cannot be fully explained, it is believed that the chortling noise phenomenon results from standing wave pressure patterns which are established within the vibration isolator and which are caused by the arrangement of the decoupler disc in opposed relation with the movable upper chamber wall. In the present invention, the cooperation of the concave decoupler disc configuration and peripheral edge constraints provided by the cage prevent the standing wave pressure patterns from building up to objectionable levels. Thus, this embodiment of the present invention eliminates undesirable chortling noises in addition to providing advantages discussed heretofore with respect to the preceding embodiments.

In view of the foregoing, it should be apparent that the present invention now provides an improved vibration isolator which retains the beneficial dynamic operating characteristics of a decoupler disc and a diaphragm yet which is noiseless in operation, durable in construction, predictable in performance, and readily manufacturable.

While preferred embodiments of the present invention have been described in detail, various modifications, alterations and changes may be made without departing from the spirit and scope of the present invention as defined in the appended claims.

We claim:

1. In a vibration isolator including opposed fluid filled chambers, an inertia track passageway providing fluid communication therebetween, and a decoupler assembly cooperable with the chambers and the inertia track passageway to provide certain operating characteristics, the improvement wherein the decoupled assembly comprises:

cage means providing a cavity between said chambers, a flexible decoupler disc mounted in said perforate cavity and having opposite sides confronting said chambers, said cage means having spaced confronting outer annular surfaces surrounding said decoupler disc adjacent to its periphery for mounting said disc for flexure in alternate transverse directions relative to said chambers in response to alternating fluid pressure differentials therebetween, said cage means outer/surfaces engaging said decoupler disc to prevent peripheral translatory motion of the disc while providing peripheral fulcrums for permitting said disc to pivot thereabout and to flex without substantial tension adjacent to its periphery, and surface means located on opposite sides of said disc and on said cage means cooperable to control flexure of said disc, said surface means including transversely spaced inner surfaces on said cage means normally confronting said disc inwardly of its fulcrums for permitting portions of the disc inwardly of its periphery to flex transversely beyond the limits of said outer peripheral cage surface, said surface means on said disc and cage means being configured relative to one another to progressively arrest disc flexure in a radially inward direction by engaging the disc inwardly of its periphery at transverse locations spaced apart at radially increasing distances, wherein said decoupler disc has a peripheral edge of a predetermined thickness and opposite surfaces recessed therefrom, said outer annular cage surfaces engaging said disc continuously inward of its edge to provide said fulcrums and continuous seals about the periphery of the disc whereby the decoupler assembly is characterized by quiet operation and fatigue resistance.

2. A vibration isolator according to claim 1 wherein said opposite surfaces of said decoupler disc are concave so that the disc has a minimum thickness centrally thereof.

3. A vibration isolator according to claim 2 wherein said opposite surfaces of said disc are conical and intersect the peripheral edge of the disc at an acute angle to provide continuous feathered edges thereat.

4. In a vibration isolator including opposed fluid filled chambers, an inertia track passageway providing fluid communication therebetween, and a decoupler assembly cooperable with the chambers and the inertia track passageway to provide certain operating characteristics, the improvement wherein the decoupler assembly includes a complementary pair of engaged superimposed plates defining at least a portion of a partition separating said chambers, said plates being formed to provide said inertia track passageway therebetween and to define a decoupler cage located inwardly of said inertia track passageway in fluid communication with said chambers, a flexible decoupler disc mounted in said cage, said decoupler disc having opposite sides confronting said chambers and a periphery with a circumferential bead thereon, said partition plates having converging surfaces surrounding said decoupled disc periphery and engaging said circumferential bead for mounting said decoupler disc for flexure in alternate directions relative to said chambers, said converging partition plate surfaces cooperating with the bead to provide fulcrums at the periphery of the disc for permitting said disc to pivot thereabout and thereby to flex without substantial tension adjacent to its periphery while preventing fluid leakage between the decoupler cage and the inertia track passageway and between the fluid chambers wherein said partition plates are of rigid construction and define between the decoupler cage and inertia track passageway a tapered joint confronting said decoupler disc periphery and said partition plates have confronting surfaces that diverge from the medial plane of the decoupler disc at a plurality of angles in radially spaced regions inwardly of the decoupler disc periphery, and said decoupler disc is of elastomeric construction and its peripheral bead engages in said joint to seal the same against leakage, and the decoupler disc has raised ribs of radially inwardly decreasing height on opposite sides for operatively engaging said plate surfaces to provide said progressive disc flexure arresting action.

5. In a vibration isolator including opposed fluid filled chambers, an inertia track passageway providing fluid communication therebetween, and a decoupler assembly cooperable with the chambers and the inertia track passageway to provide certain operating characteristics, the improvement wherein the decoupler assembly comprises:

cage means providing a cavity between said chambers, a flexible decoupler disc mounted in said cavity and having a peripheral edge of a predetermined thickness and opposite surfaces recessed inwardly therefrom to provide a thinner central portion, said cage means having spaced confronting annular surfaces continuously engaging said disc inwardly of its edge and mounting said disc for flexure in alternate transverse directions relative to said chambers in response to alternating fluid pressure differentials therebetween, said cage means surfaces preventing peripheral translation of the disc while providing continuous peripheral fluid seals and fulcrums and permitting said disc to pivot thereabout and to flex without substantial tension adjacent to its periphery, whereby the decoupler assembly is characterized by quiet operation and fatigue resistance.

6. A vibration isolator according to claim 5 wherein said opposite surfaces of said decoupler disc are concave so that the disc has a minimum thickness centrally thereof.

7. A vibration isolator according to claim 6 wherein said concave surfaces intersect the disc edge at an acute angle to provide continuous feathered edge seals about the periphery of the disc.

8. A vibration isolator according to claim 7 wherein said concave surfaces are conical and converge centrally of the disc to provide said minimum thickness thereat.

9. A method of eliminating chortling noises with a vibration isolator having opposed fluid filled chambers fluidly interconnected by an elongate inertia track passageway and having a disc decoupler disposed intermediate the chambers for cooperating with the fluid therein to provide certain dynamic stiffness characteristics, the method comprising the steps of:
  alternately pressurizing the fluid in the chambers for causing it to deflect the decoupler disc in alternate directions,
  confining between said chambers a flexible decoupler disc having concave opposite sides and a continuous feathered edge adjacent to its peripheral edge,
  restraining the decoupler disc circumferentially by continuously engaging its feathered edges so that the disc pivots thereat and flexes centrally thereof without its peripheral edge undergoing translatory motion and without being subjected to tension,
whereby certain high frequency noises are attenuated.

10. For use in a vibration isolator having an inertia track passageway in fluid communication between fluid chambers and a cage for containing a decoupler disc cooperable with the inertia track passageway to provide certain dynamic operating characteristics, a flexible decoupler disc having a plurality of radially separated circumferential ribs on opposite sides thereof, said ribs being of progressively decreasing height in a radially inward direction from the periphery of the disc.

11. A decoupler disc according to claim 10 wherein said decoupler disc is of molded elastomeric construction.

12. A decoupler disc according to claim 10 including a bead extending circumferentially about the periphery of the disc.

13. A vibration isolator including opposed fluid filled chambers, an inertia track passageway providing fluid communication therebetween, and a decoupler assembly cooperable with the chambers and the inertia track passageway to provide certain operating characteristics, the improvement wherein the decoupler assembly includes a complementary pair of engaged superimposed plates defining at least a portion of a partition separating said chambers, said plates being formed to provide said inertia track passageway therebetween and to define a decoupler cage located inwardly of said inertia track passageway in fluid communication with said chambers, a flexible decoupler disc mounted in said cage, said decoupler disc having opposite sides confronting said chambers and a periphery with a circumferential bead thereon, said partition plates having converging surfaces surrounding said decoupler disc periphery and engaging said circumferential bead for mounting said decoupler disc for flexure in alternate directions relative to said chambers, said converging partition plate surfaces cooperating with the bead to provide fulcrums at the periphery of the disc for permitting said disc to pivot thereabout and thereby to flex without substantial tension adjacent to its periphery while preventing fluid leakage between the decoupler cage and the inertia track passageway and between the fluid chambers wherein said partition plates are of rigid construction and define between the decoupler cage and inertia track passageway a tapered joint confronting said decoupler disc periphery, and said decoupler disc is of elastomeric construction and its peripheral bead engages in said joint to seal the same against leakage wherein said partition plates have confronting surfaces that include a plurality of peripherally spaced outstruck tabs terminating above and below the decoupler disc, and the decoupler disc has raised ribs of radially inwardly decreasing height on opposite sides for operatively engaging the tabs to provide said progesive disc flexure arresting action.

* * * * *